US012767333B2

(12) United States Patent
Keck et al.

(10) Patent No.: US 12,767,333 B2
(45) Date of Patent: Oct. 20, 2026

(54) UNIVERSAL STRONGBACK FOR AN INTERNAL CABIN OF A VEHICLE

(71) Applicant: THE BOEING COMPANY, Arlington, VA (US)

(72) Inventors: Russell Warren Keck, Seattle, WA (US); Roland Mair, Kenmore, WA (US)

(73) Assignee: The Boeing Company, Arlington, VA (US)

( * ) Notice: Subject to any disclaimer, the term of this patent is extended or adjusted under 35 U.S.C. 154(b) by 11 days.

(21) Appl. No.: 19/014,492

(22) Filed: Jan. 9, 2025

(65) Prior Publication Data

US 2025/0361013 A1 Nov. 27, 2025

Related U.S. Application Data

(60) Provisional application No. 63/650,973, filed on May 23, 2024.

(51) Int. Cl.
*B64D 11/00* (2006.01)

(52) U.S. Cl.
CPC .................................. *B64D 11/003* (2013.01)

(58) Field of Classification Search
CPC .................................................... B64D 11/003
See application file for complete search history.

(56) References Cited

U.S. PATENT DOCUMENTS 7,723,935 B2 5/2010 Kneller et al.
8,636,251 B2 * 1/2014 Mayer .................. B64D 11/003 244/118.1
8,657,231 B2 * 2/2014 Burrows .............. B64D 11/003 244/118.1
9,090,351 B1 * 7/2015 Frazier ................. B64D 11/003
2009/0146351 A1 * 6/2009 Boerschig ............. F16F 9/3405 137/829
2012/0012705 A1 * 1/2012 Mayer .................. B64D 11/003 29/401.1
2015/0069182 A1 * 3/2015 Jacobsen ................ B64D 13/00 244/118.5
2015/0090838 A1 * 4/2015 Schmitz ............... B64D 11/003 29/434
2018/0029709 A1 * 2/2018 Savian ............... B64D 11/0015
2019/0293057 A1 * 9/2019 Macaraeg ............ B64D 11/003

FOREIGN PATENT DOCUMENTS

EP 0614806 9/1998

OTHER PUBLICATIONS

Extended European Search Report for EP App. No. 25168895.8-1009, dated Jun. 16, 2025.

* cited by examiner

*Primary Examiner* — Alentina Xavier
(74) *Attorney, Agent, or Firm* — Joseph M. Butscher; Carroll, Hoette & Butscher, LLC

(57) ABSTRACT

A strongback is within the internal cabin of an aircraft. A first stowage bin is configured to couple to the strongback. The first stowage bin has a first size and a first shape. A second stowage bin is also configured to couple to the strongback. The second stowage bin has a second size and a second shape. One or both of the first size differs from the second size, or the first shape differs from the second shape. The strongback is configured to interchangeably receive and retain the first stowage bin and a second stowage bin.

20 Claims, 10 Drawing Sheets

UNIVERSAL STRONGBACK FOR AN INTERNAL CABIN OF A VEHICLE

CROSS-REFERENCE TO RELATED APPLICATION

This application relates to and claims priority benefits from U.S. Provisional Patent Application No. 63/650,973, filed May 23, 2024, which is hereby incorporated by reference in its entirety.

FIELD OF THE DISCLOSURE

Examples of the present disclosure generally relate to a universal strongback configured to interchangeably retain different types of stowage bin assemblies within an internal cabin of a vehicle, such as a commercial aircraft.

BACKGROUND OF THE DISCLOSURE

Aircraft are used to transport passengers and cargo between various locations. Numerous aircraft depart from and arrive at a typical airport every day.

An internal cabin of a commercial aircraft typically includes numerous stowage bins configured to retain carry-on baggage, for example. Each stowage bin is moveably coupled to a strongback. The stowage bins are configured to move relative to the strongbacks between an open position and a closed position.

Different types of stowage bins typically require a unique sidewall panel height, a unique air conditioning (AC) rail position and structural brackets, a unique passenger service unit (PSU) cavity wire bundle routing, a unique strongback, unique ceiling/cross bin light modules and spacers, unique underbin class dividers and underbin monuments, unique sky dividers, etc. Each Stowage bin typically also has a unique pivot point location, which typically requires coupling with a unique strongback.

In general, different types of stowage bins typically secure to a specific, unique associated strongback. That is, a specific, unique type of strongback is configured for use with a particular type of stowage bin. If a different style of stowage bin is desired, the strongback for another type of stowage bin cannot be used with the different style of stowage bin. As such, if an operator desires to change a style of stowage bin within an internal cabin of an aircraft, the stowage bins and the strongbacks need to be removed and replaced with the desired style of stowage bins and associated strongbacks. As can be appreciated, the process of removing strongbacks from an internal cabin is time-consuming, labor-intensive, and expensive.

SUMMARY OF THE DISCLOSURE

A need exists for a strongback capable of coupling to different types of stowage bins. Further, a need exists for a method for efficiently replacing a first style of stowage bin with a different, second style of stowage bin within an internal cabin of a vehicle, such as a commercial aircraft.

With those needs in mind, certain examples of the present disclosure provide a strongback for an internal cabin of an aircraft. The strongback includes a rear wall, a lower panel connected to the rear wall, a closeout bracket connected to the rear wall and the lower panel, and an upper panel connected to the rear wall. A first end blade is connected to the rear wall, the lower panel, the closeout bracket, and the upper panel at a first end. A second end blade is connected to the rear wall, the lower panel, the closeout bracket, and the upper panel at a second end opposite from the first end. A bin-retaining chamber is defined between the rear wall, the lower panel, the closeout bracket, the upper panel, the first end blade, and the second end blade. The strongback is configured to interchangeably receive and retain a first stowage bin and a second stowage bin within the bin-retaining chamber. The first stowage bin differs from the second stowage bin in one or both of size and shape.

In at least one example, the first end blade mirrors the second end blade.

In at least one example, the strongback also includes a first support bracket extending from an outer surface of the first end blade at a first lower outer side to a front lateral edge of the lower panel, and a second support bracket extending from an outer surface of the second end blade at a second lower outer side to a rear lateral edge of the lower panel. As a further example, each of the first support bracket and the second support bracket includes a linear strap.

In at least one example, the first end blade includes a first pivot coupling on a first interior surface. The second end blade includes a second pivot coupling on a second interior surface. The first pivot coupling is coaxial with the second pivot coupling of the second end blade. The first pivot coupling and the second pivot coupling are configured to pivotally couple to reciprocal pivot members of each of the first stowage bin and the second stowage bin.

The strongback can also include one or more rate control members extending from rear, interior surfaces of one or both of the first end blade or the second end blade. The one or more rate control members can include a housing defining an internal chamber, and a piston configured to move within the housing.

In at least one example, the strongback also includes one or more latch strikes disposed on front interior surfaces of one or both of the first end blade or the second end blade. As a further example, the first stowage bin includes one or more first latches having a first length. The second stowage bin includes one or more second latches having a second length that differs from the first length. The one or more first latches and the one or more second latches are configured to latchably engage the one or more latch strikes.

Certain examples of the present disclosure provide a method for an internal cabin of an aircraft. The method includes coupling a first stowage bin having a first size and a first shape to a strongback; removing the first stowage bin from the strongback; and coupling a second stowage bin having a second size and a second shape to the strongback. The first size differs from the second size, and/or the first shape differs from the second shape.

Certain examples of the present disclosure provide an aircraft including an internal cabin. A strongback is within the internal cabin of an aircraft. A first stowage bin is configured to couple to the strongback. The first stowage bin has a first size and a first shape. A second stowage bin is also configured to couple to the strongback. The second stowage bin has a second size and a second shape. The first size differs from the second size, and/or the first shape differs from the second shape. The strongback is configured to interchangeably receive and retain the first stowage bin and a second stowage bin.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide a universal strongback configured to couple to different types of stowage bins within an internal cabin of a vehicle, such as a commercial aircraft. That is, a first stowage bin can be moveably secured to the stowage bin, and a second stowage bin that differs from the first stowage bin can also be moveably secured to the stowage bin. The first stowage bin and the second stowage bin differ in type, style, and/or the like. For example, the first stowage bin can be larger or smaller than the second stowage bin. As another example, the first stowage bin can have a different shape than the stowage bin. The first stowage bin and the second stowage bin differ in one or more of size, shape, number of components, locations of couplings, and/or the like. The first stowage bin can be removed from the strongback and replaced with the second stowage bin, and vice versa.

In at least one example, a universal strongback is configured to receive and moveably (such as pivotally) retain two or more architecturally distinct stowage bins. The universal strongback allows offering of multiple different, distinct stowage bins without complications typically associated with variability, cost, and complexity. The different types of stowage bins differ in relation to one or more variables (such as size, shape, retaining volume, and/or the like), but the universal strongback is configured to receive and moveably retain the different types of stowage bins. Therefore, other adjacent cabin architecture elements (for example, sidewalls, AC rail, PSU cavity wiring, lighting, underbin furnishings, and the like) can remain stable and constant, thereby significantly reducing variability in engineering, supply chain, and production.

Additionally, the universal strongback substantially reduces transition and reconfiguration costs if and when operators desire a change to the internal cabin, such as a change in a style of stowage bin. Further, the strongbacks allow for removal and replacement of one or more stowage bins, such as between flights of an aircraft.

Figure 1:
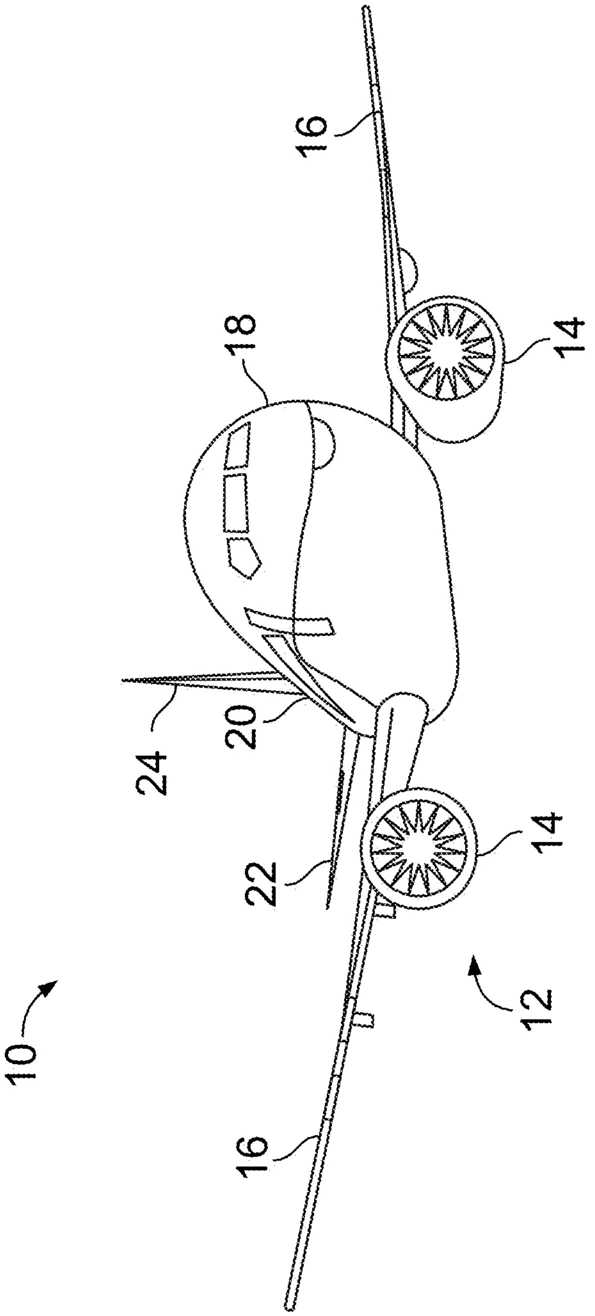
FIG. 1 illustrates a perspective front view of an aircraft.

FIG. 1 illustrates a perspective front view of an aircraft 10. The aircraft 10 includes a propulsion system 12 that includes engines 14, for example. Optionally, the propulsion system 12 may include more engines 14 than shown. The engines 14 are carried by wings 16 of the aircraft 10. In other examples, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which includes a flight deck or cockpit, one or more work sections (for example, galleys, personnel carry-on baggage areas, and the like), one or more passenger sections (for example, first class, business class, and coach sections), one or more lavatories, and/or the like. The universal strongback, which is configured to receive and moveably retain different types of stowage bins, disclosed herein can be located within the internal cabin of the aircraft.

Optionally, instead of an aircraft, examples of the universal strongback can be used with various other types of vehicles. Suitable vehicles include automobiles, buses, trucks, locomotives and train cars, watercraft, spacecraft, and the like.

Figure 2A:
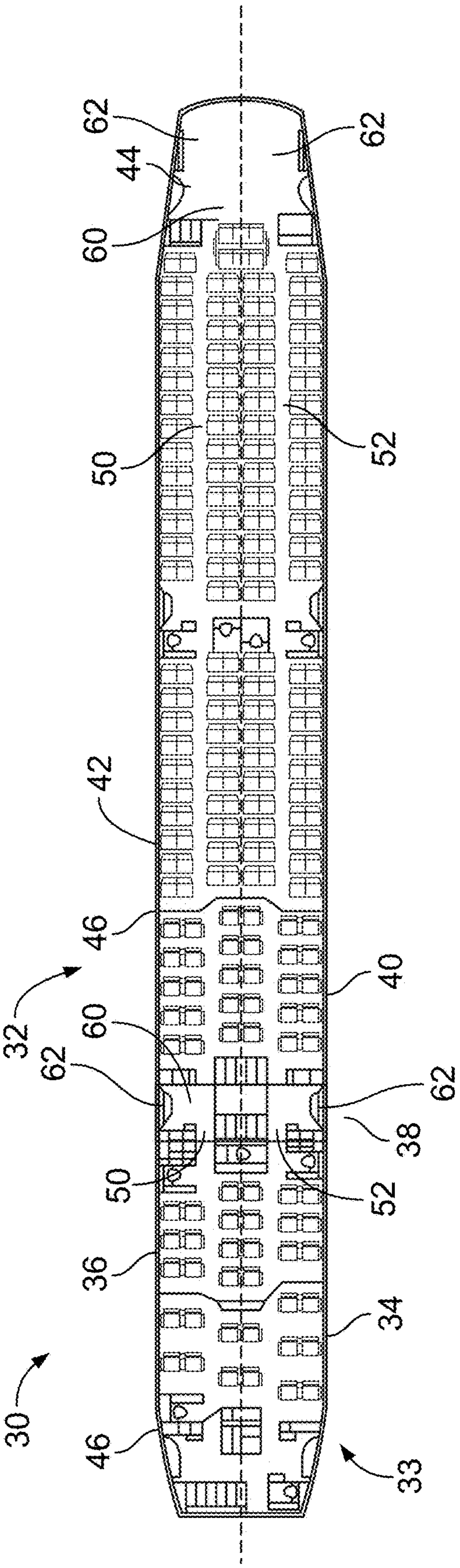
FIG. 2A illustrates a top plan view of a first internal cabin of an aircraft.

FIG. 2A illustrates a top plan view of a first internal cabin 30 of an aircraft. The internal cabin 30 is within a fuselage 32 of the aircraft. The fuselage 32 may be the fuselage 18 of the aircraft 10 in FIG. 1. One or more fuselage walls may define the internal cabin 30. The internal cabin 30 includes multiple sections, including a front section 33, a first class section 34, a business class section 36, a front galley station 38, an expanded economy or coach section 40, a standard economy of coach section 42, and an aft section 44, which may include multiple lavatories and galley stations. The internal cabin 30 may include more or less sections than shown. For example, the internal cabin 30 may not include a first class section, and may include more or less galley stations than shown. At least some of the sections may be separated by a cabin transition area 46, which may include class divider assemblies.

As shown in FIG. 2A, the internal cabin 30 includes two aisles 50 and 52 that lead to the aft section 44. The aisles 50, 52 may extend to egress paths or door passageways 60. Exit doors 62 are located at ends of the egress paths 60. Optionally, the internal cabin 30 may have more or less aisles than shown in the illustrated example. For example, the internal cabin 30 may include a single aisle that extends through the center of the internal cabin 30 and leads to the aft section 44. The internal cabin 30 may include more or fewer egress paths 60 and/or different locations of egress paths 60 in an alternative example.

The universal strongback, which is configured to receive and moveably retain different types of stowage bins, according to the examples disclosed herein can be installed within the internal cabin 30.

Figure 2B:
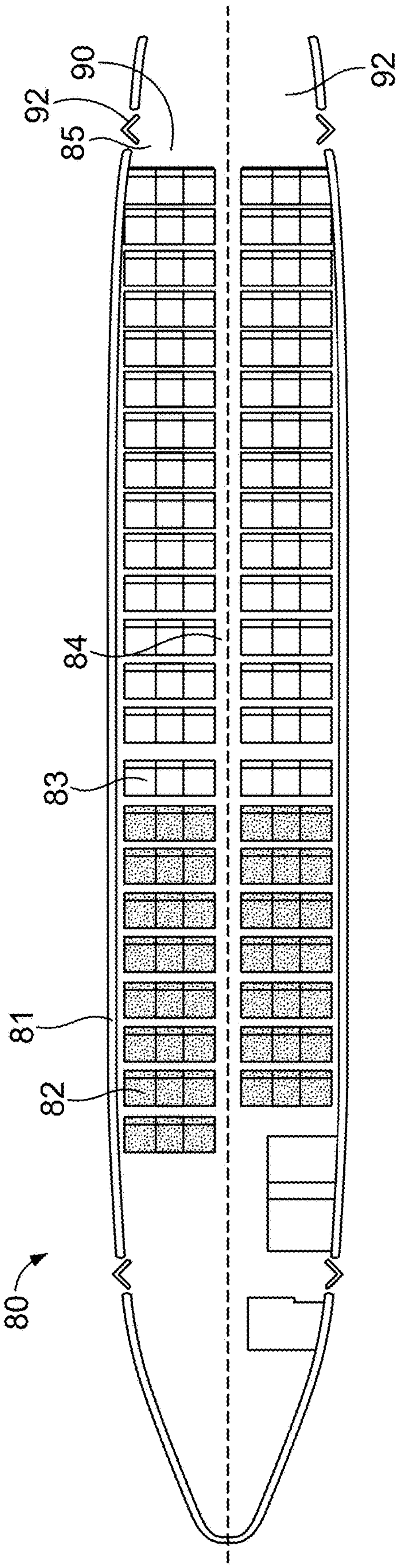
FIG. 2B illustrates a top plan view of a second internal cabin of an aircraft.

FIG. 2B illustrates a top plan view of a second internal cabin 80 of an aircraft. The internal cabin 80 is within a fuselage 81 of the aircraft. The fuselage 81 may be the fuselage 18 of the aircraft 10 in FIG. 1. One or more fuselage walls may define the internal cabin 80. The internal cabin 80 includes multiple sections, including a main cabin 82 having passenger seats 83, and an aft section 85 behind the main cabin 82 (relative to a front end of the aircraft). The internal cabin 80 may include more or less sections than shown.

The internal cabin 80 may include a single aisle 84 that leads to the aft section 85. The aisle 84 may extend through the center of the internal cabin 80. For example, the aisle 84 may be coaxially aligned with a center (for example, medial) longitudinal plane of the internal cabin 80, halfway between the two sides of the internal cabin 80. The aisle 84 extends to an egress path or door passageway 90. Exit doors 92 are located at ends of the egress path 90. The universal strongback, which is configured to receive and moveably retain different types of stowage bins, according to the examples disclosed herein can be installed within the internal cabin 80.

Figure 3:
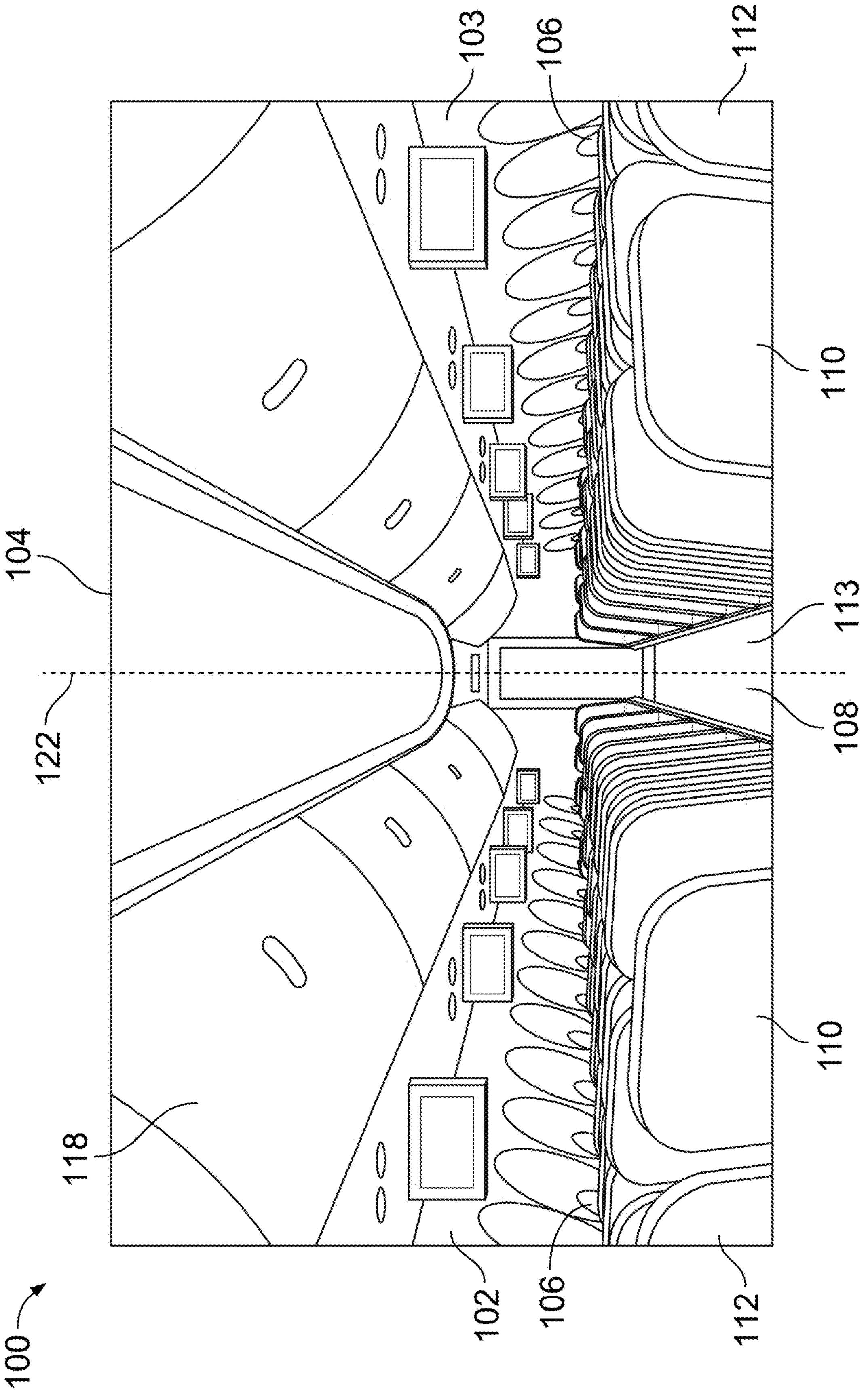
FIG. 3 illustrates a perspective interior view of an internal cabin of an aircraft.

FIG. 3 illustrates a perspective interior view of an internal cabin 100 of an aircraft. The internal cabin 100 may be within the aircraft 10 shown in FIG. 1. The internal cabin 100 may be the internal cabin 80 shown in FIG. 2B. The internal cabin 100 includes a floor assembly 108 that extends from a first side 102 of the cabin 100 to a second side 103 of the cabin 100. The first and second sides 102, 103 are defined at least in part by sidewall assemblies that connect to a ceiling 104 of the cabin 80. The internal cabin 100 includes windows 106 along the first and second sides 102, 103. The floor assembly 108 supports rows 112 of seats 110. In the illustrated example, each row 112 includes groups of three seats 110 on either side of a single aisle 113. The rows 112 are spaced apart along a longitudinal length of the cabin 80. In alternative configurations, at least some rows may include groups of more or less than three seats and/or at least two aisles.

The internal cabin includes stowage bins 118 which are moveably coupled to strongbacks (not shown in FIG. 3). The stowage bins 118 are configured to move between a closed position (as shown in FIG. 3), and an open position. In at least one example, the strongbacks are universal in that they are configured to receive and moveably retain different types of stowage bins 118. For example, one or more of the stowage bins 118 can be removed from a strongback, and replaced with a stowage bin of a different type.

As used herein, the term "outboard" means a position that is farther away from a center (for example, medial) longitudinal plane 122 of the internal cabin 100, relative to another component. The center longitudinal plane 122 is halfway between the first and second sides 102, 103. The term "inboard" means a position that is closer to the center longitudinal plane 122 relative to another component.

Figure 4:
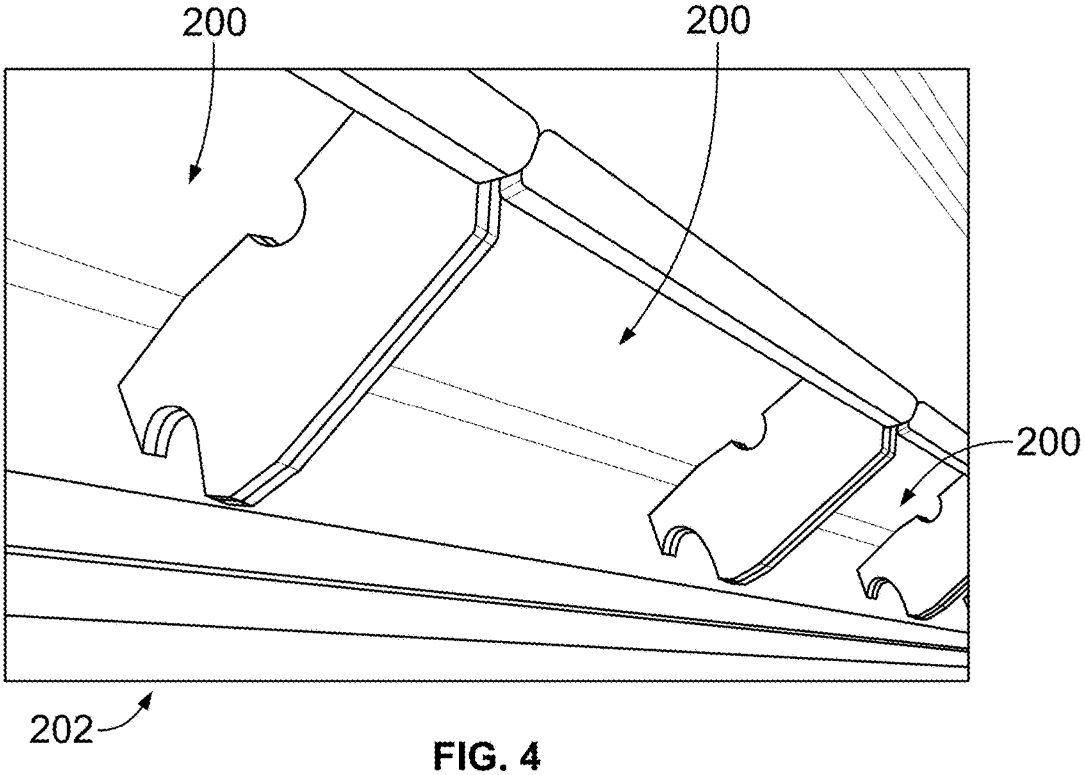
FIG. 4 illustrates a perspective front view of strongbacks within an internal cabin, according to an example of the present disclosure.

FIG. 4 illustrates a perspective front view of strongbacks 200 within an internal cabin 202, according to an example of the present disclosure. Each strongback 200 is configured the same. For example, the strongbacks 200 are sized and shaped the same. The strongbacks 200 are universal in that they are configured to receive and retain architecturally different (that is, different types, styles, or the like) stowage bins.

Figure 5:
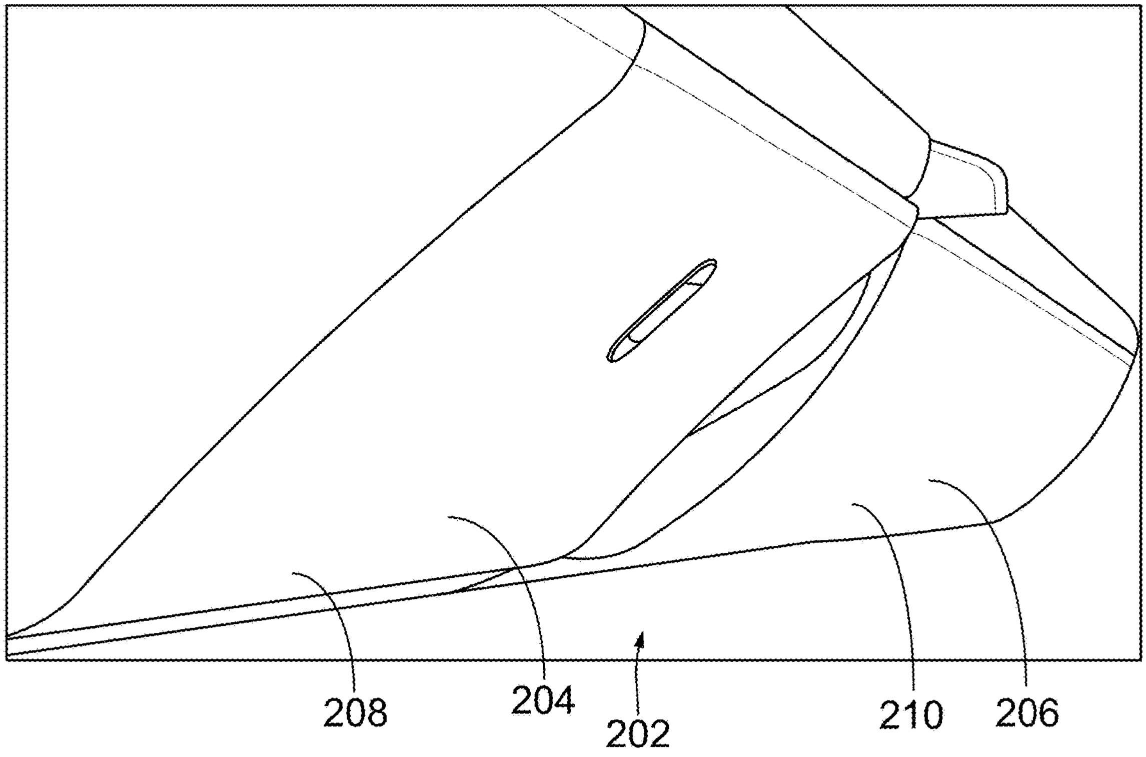
FIG. 5 illustrates a perspective front view of stowage bins within the internal cabin, according to an example of the present disclosure.

FIG. 5 illustrates a perspective front view of stowage bins 204 and 206 within the internal cabin 202, according to an example of the present disclosure. Referring to FIGS. 4 and 5, each strongback 200 is configured to receive and moveably retain the stowage bin 204 and the stowage bin 206. The stowage bins 204 and 206 are architecturally different. For example, the stowage bins 204 and 206 have different front covers 208 and 210, respectively. As a further example, the stowage bin 204 has a first retaining chamber having a first volume, while the stowage bin 206 has a second retaining chamber having a second volume that differs from the first volume. The second volume can be greater than the first volume. The stowage bin 204 can be configured to retain four standard-sized carry-on bags, while the stowage bin 206 can be configured to retain six standard-sized carry-on bags. The stowage bin 204 can be removed from a strongback 200, and replaced with the stowage bin 206, or vice versa.

Figure 6:
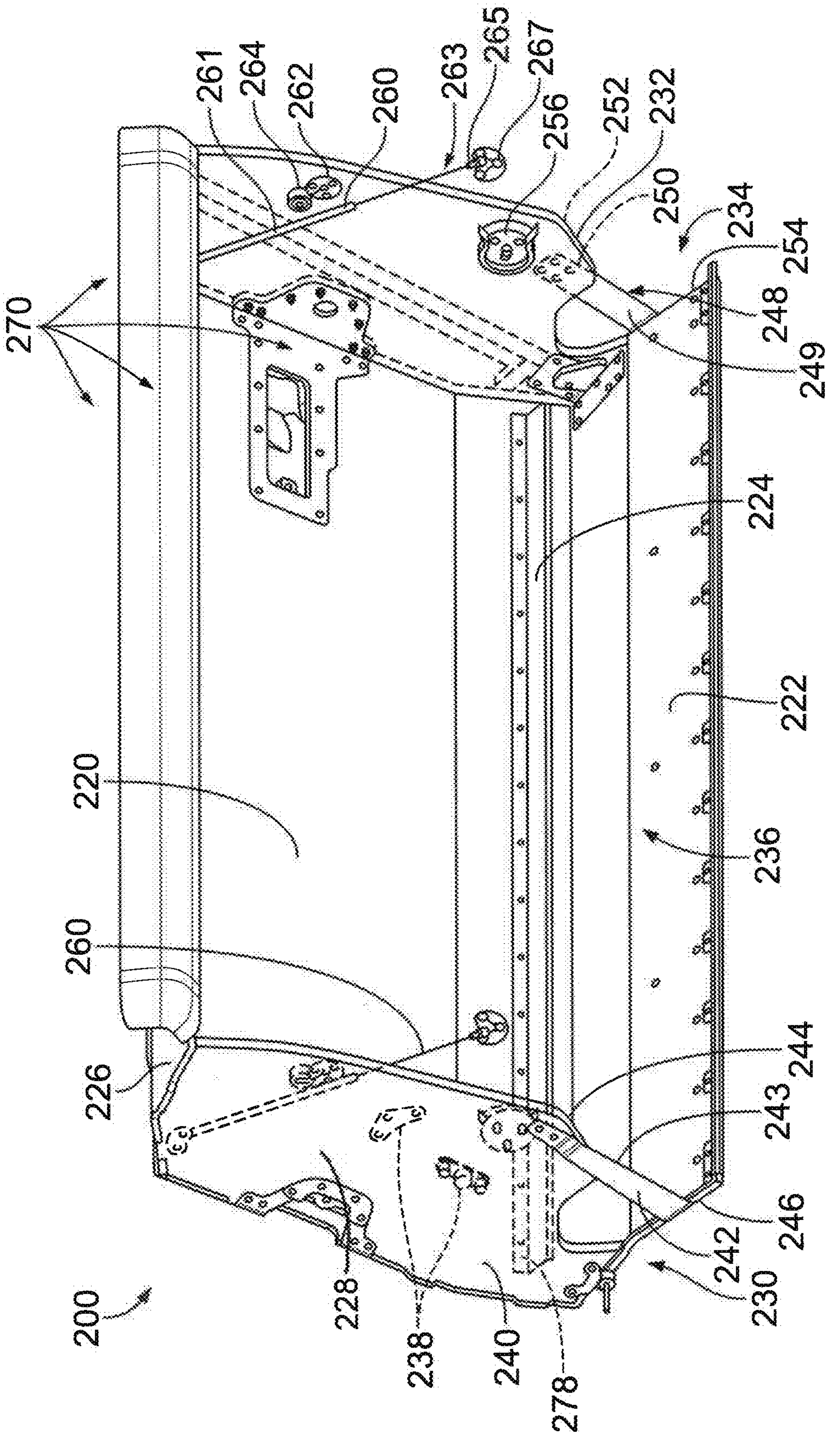
FIG. 6 illustrates an isometric front view of a strongback, according to an example of the present disclosure.

FIG. 6 illustrates an isometric front view of a strongback 200, according to an example of the present disclosure. The strongback 200 includes a rear wall 220 connected to a lower panel 222 and a closeout bracket 224. The closeout bracket 224 can close a gap between the rear wall and the lower panel. An upper panel 226 connects to the rear wall 220 distal from the closeout bracket 224. A first end blade 228 connects to the rear wall 220, the lower panel 222, the closeout bracket 224, and the upper panel 226 at a first end 230 (such as a fore end). A second end blade 232 connects to the rear wall 220, the lower panel 222, the closeout bracket 224, and the upper panel 226 at a second end 234 (such as an aft end), which is opposite from the first end 230. In at least one example, the first end blade 228 and the second end blade 232 mirror one another. For example, features of the first end blade 228 and the second end blade 232 that face one another are at the same axial locations and within the same envelopes. A bin-retaining chamber 236 is defined between the rear wall 220, the lower panel, the closeout bracket 224, the upper panel 226, the first end blade 228 and the second end blade 232.

The strongback 200 is for an internal cabin of an aircraft, for example. The strongback 200 is configured to interchangeably receive and retain a first stowage bin (such as the stowage bin 204 or 206) and a second stowage bin (such as the other of the stowage bin 204 or 206) within the bin-retaining chamber 236. For example, the first stowage bin 204 can be selectively coupled to, removed from, and replaced with the stowage bin 206, and vice versa. As noted, the first stowage bin 204 differs from the second stowage bin 206 in one or both of size and shape.

The first end blade 228 and the second end blade 232 are configured to be compatible with two or more architecturally different stowage bins. One or more bin assist mechanism interfaces 238 are disposed on an outer surface 240 (that is, facing away from the bin-retaining chamber 236) of the first end blade 228 and/or the second end blade 232. In at least one example, each of the first end blade 228 and the second end blade 232 include bin assist mechanism interfaces 238 on outer surfaces.

A support bracket 242 extends from the outer surface 240 of the first end blade 228 at a lower outer side 244 to a front lateral edge 246 of the lower panel 222. In at least one example, the support bracket 242 includes a linear strap 243 that is secured to the lower outer side 244 and the front lateral edge 246 by one or more fasteners, such as bolts, screws, or the like. Similarly, a support bracket 248 extends from an outer surface 250 of the second end blade 232 at a lower outer side 252 to a rear lateral edge 254 of the lower panel 222. In at least one example, the support bracket 248 includes a linear strap 249 that is secured to the lower outer side 252 and the front lateral edge 254 by one or more fasteners, such as bolts, screws, or the like. In at least one example, the support bracket 248 mirrors the support bracket 248.

Pivot couplings 256 are disposed on interior surfaces of the first end blade 228 and the second end blade 232. The pivot couplings 256 are coaxial with one another, and configured to couple to reciprocal pivot members of the stowage bins 204 and 206 (shown in FIG. 5). The pivot couplings 256 are at a common location for each of the stowage bins 204 and 206. The stowage bins 204 and 206 are configured to pivot between an open position and closed position about an interface between the pivot members and the pivot couplings 256.

In at least example, rate control members 260 extend from rear, interior surfaces of the first end blade 228 and the second end blade 232. The rate control members 260 can include pistons, springs, and/or the like, and are also configured to connect to portions of the stowage bins 204 and 206. In at least one example, the rate control members 260 include a housing 261 defining an internal chamber, and a piston 263 configured to move within the housing 261. A distal end 265 of the piston 263 connects to a fastening bracket 267 that is configured to be secured to an interior surface of a stowage bin. The housing 261 is elongated to accommodate the longer piston 263, which is configured to operate with respect to different types of stowage bins, such as the stowage bins 204 and 206. The rate control members 260 are configured to control a rate of opening of the stowage bins. Alternatively, the strongback 200 may not include the rate control members 260.

In at least one example, latch strikes 262 are disposed on front interior surfaces of the first end blade 228 and the second end blade 232. The latch strikes 262 are configured to engage latches of the stowage bins 204 and 206. In at least one example, snubbers 264 are disposed on front interior surfaces of the first end blade 228 and the second end blade 232, proximate to the latch strikes 262. Various features 270 of the strongback 200 that do not directly interface with a stowage bin remain in consistent positions in relation to other strongbacks.

The strongback 200 is universal in that it is configured to receive and retain architecturally different types of stowage bins, such as the stowage bin 204 and the stowage bin 206. For example, the strongback 200 is configured to retain two or more distinct stowage bins, each of which has a different internal capacity for retaining luggage, for example. The pivot couplings 256 provide pivot points for the different stowage bins. That is, the pivot couplings 256 are at common locations for each of the different types of stowage bins.

Figure 7:
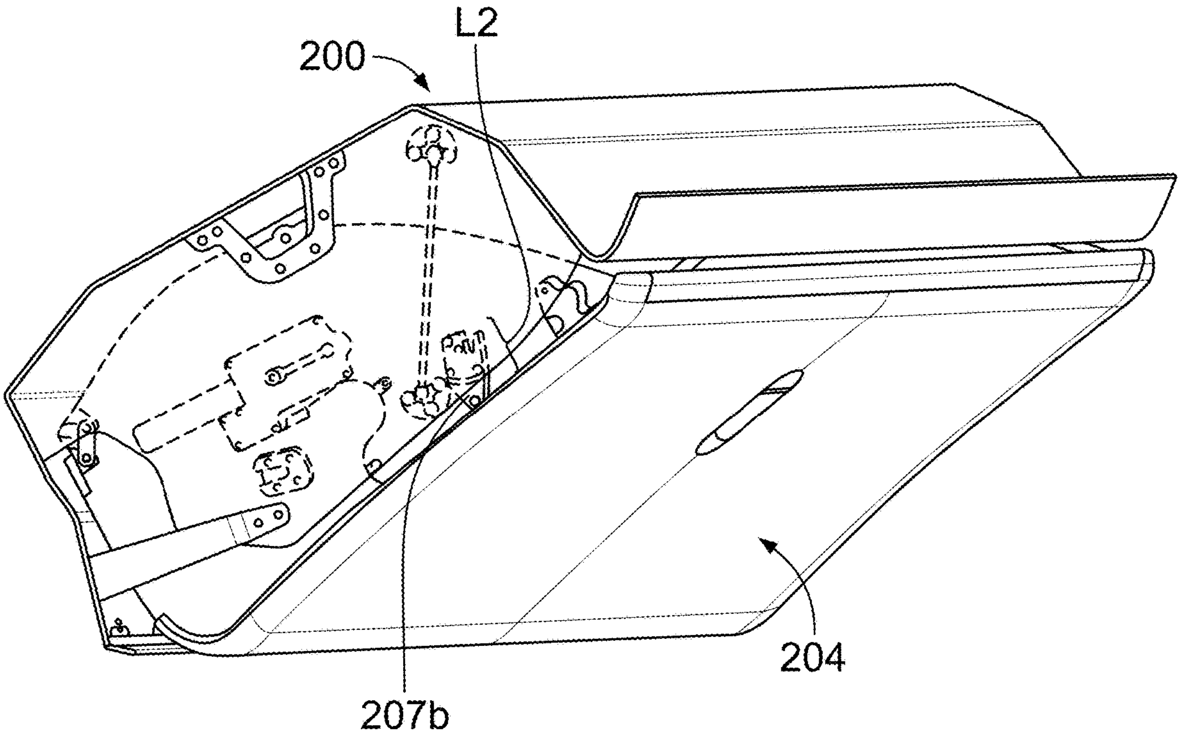
FIG. 7 illustrates an isometric front view of a first stowage bin secured in a closed position to the strongback, according to an example of the present disclosure.
Figure 8:
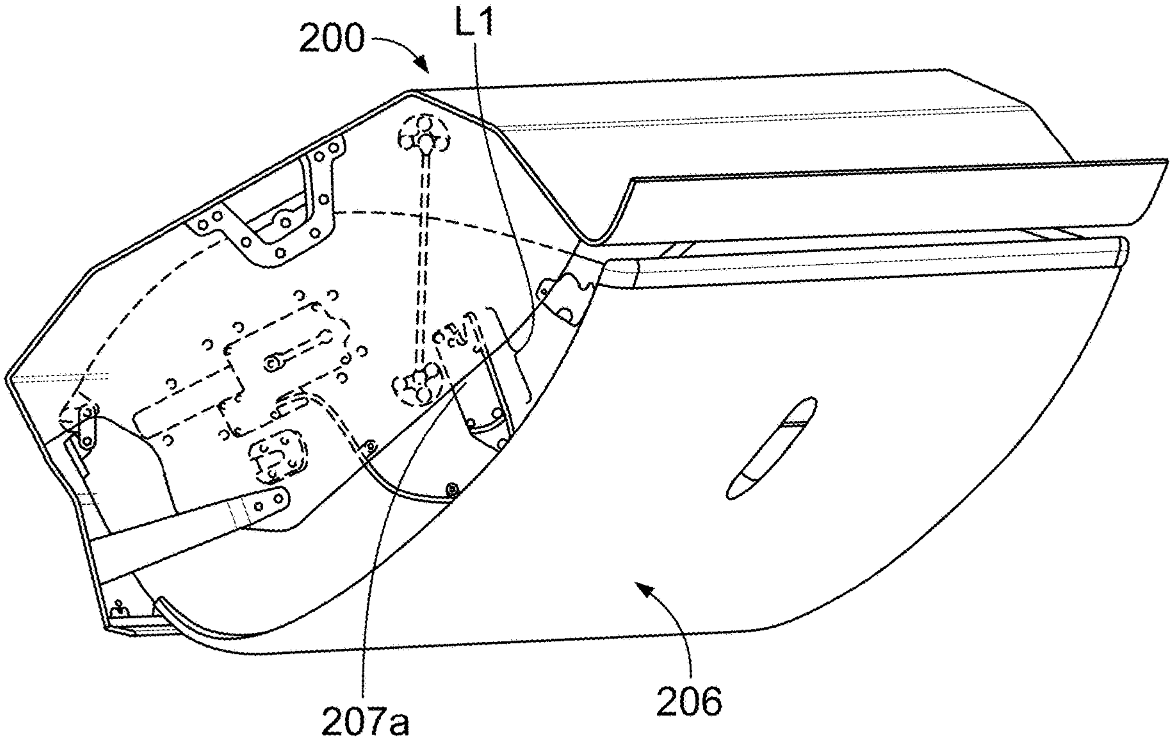
FIG. 8 illustrates an isometric front view of a second stowage bin secured in a closed position to the strongback, according to an example of the present disclosure.
Figure 9:
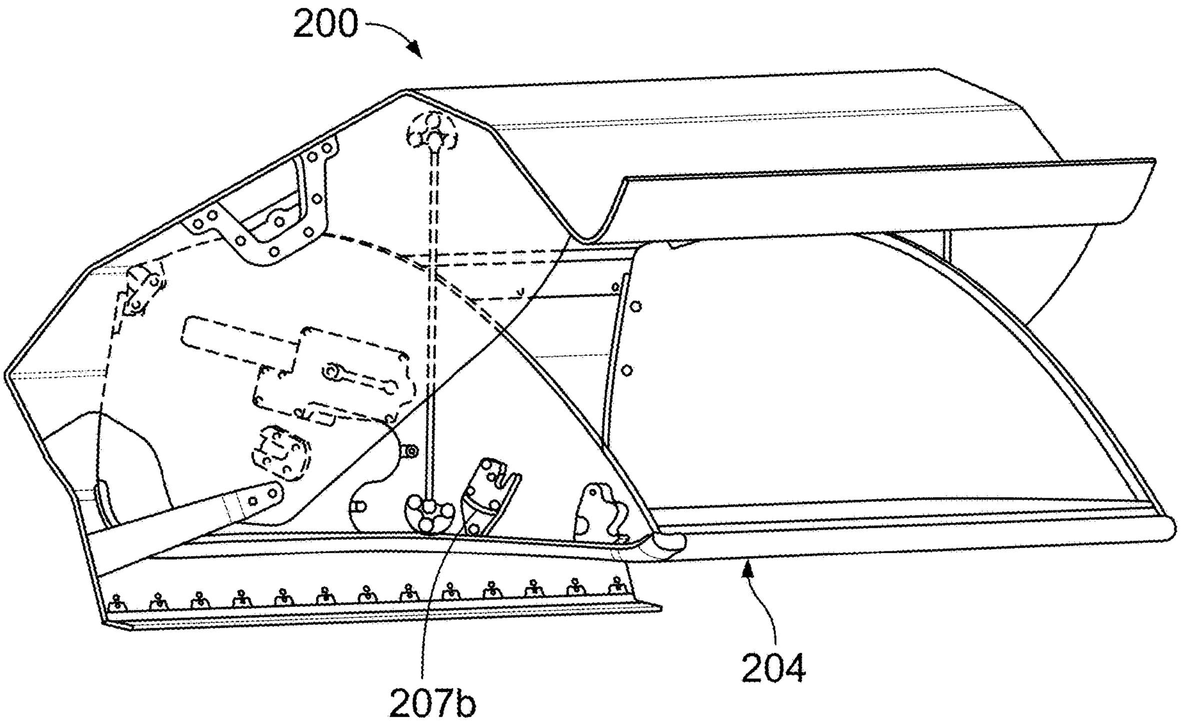
FIG. 9 illustrates an isometric front view of the first stowage bin secured in an open position to the strongback, according to an example of the present disclosure.
Figure 10:
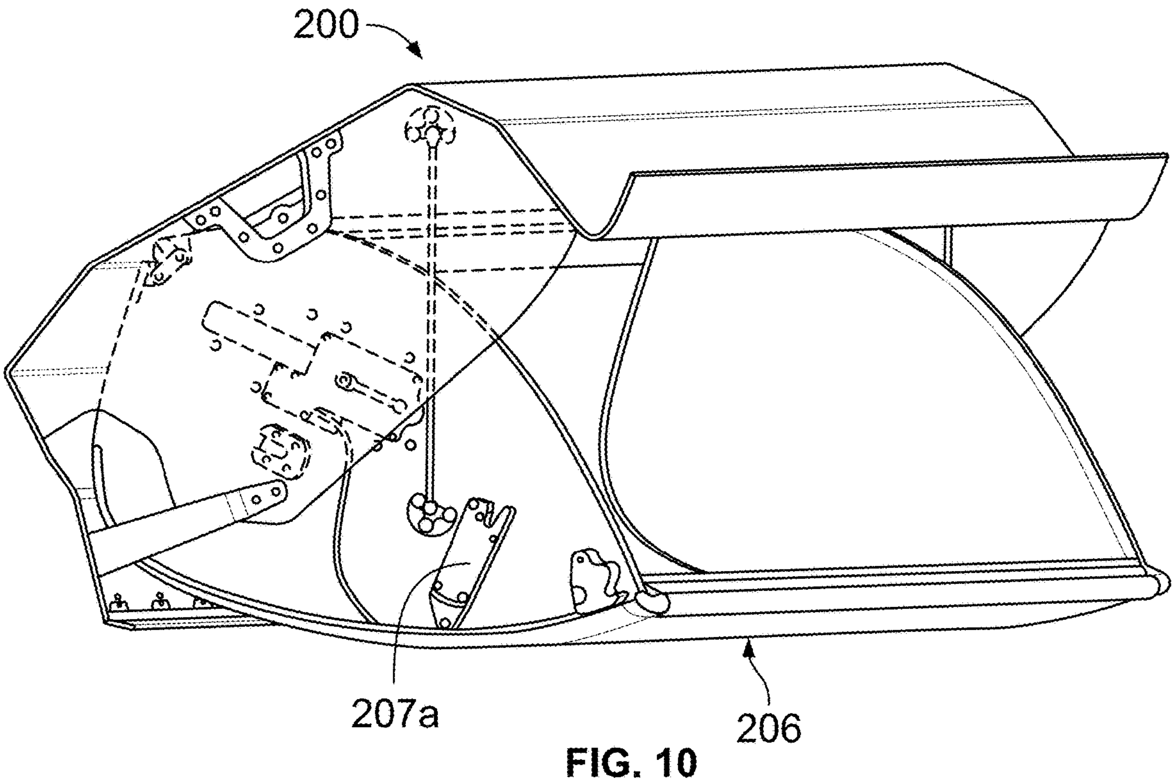
FIG. 10 illustrates an isometric front view of the second stowage bin secured in an open position to the strongback, according to an example of the present disclosure.

FIG. 7 illustrates an isometric front view of the first stowage bin 204 secured in a closed position to the strongback 200, according to an example of the present disclosure. FIG. 8 illustrates an isometric front view of a second stowage bin 206 secured in a closed position to the strongback 200, according to an example of the present disclosure. FIG. 9 illustrates an isometric front view of the first stowage bin 204 secured in an open position to the strongback 200, according to an example of the present disclosure. FIG. 10 illustrates an isometric front view of the second stowage bin 206 secured in an open position to the strongback 200, according to an example of the present disclosure. Referring to FIGS. 7-10, for the sake of clarity, portions of the strongback 200 are shown transparent. As shown, the same strongback 200 is configured to receive and retain the two different stowage bins 204 and 206, which are architecturally different (that is, differing in one or more of size, shape, retaining volume, locations of pivot members, and/or the like).

Referring to FIGS. 6-10, the latch strikes 262 are at a single common location that is compatible with different types of stowage bins, such as the stowage bin 204 and the stowage bin 206. The larger sized stowage bin 206 includes extended end latches 207*a*, which are longer than the end latches 207*b* of the smaller sized stowage bin 204. The latches 207*a* having a length L1 that differs from a length L2 of the latches 207*b*. The extended end latches 207*a* are sized and shaped to reach and latchably engage the latch strikes 262. Conversely, the smaller sized stowage bin 204 includes compact end latches 207*b*, which are shorter than the end latches 207*a*, and are also able to reach and latchably engage the latch strikes 262.

The end blades 228 and 232 provide face panels having common start and end points in relation to movement of both the different types of stowage bins 204 and 206, and can generally conform to an end contour of the smaller stowage bins 204. That is, end walls of the stowage bins 204 can generally be sized and shaped the same as the end blades 228 and 232, and may not forwardly extend past front edges of the end blades 228 when the stowage bin 204 is in the closed position. In contrast, end walls of the stowage bins 206 may forwardly extend past the front edges of the end blades 228 when the stowage bin 206 is in the closed position.

Figure 11:
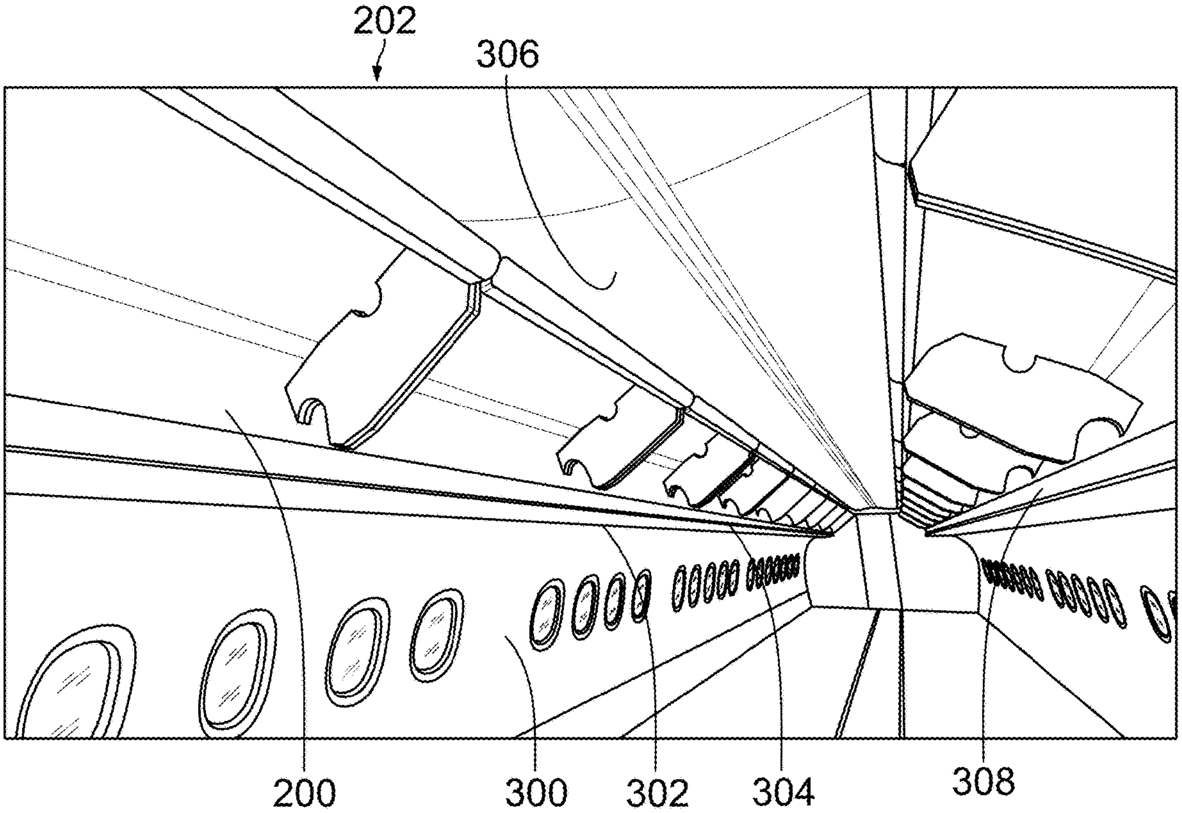
FIG. 11 illustrates a perspective interior view of an internal cabin, according to an example of the present disclosure.

FIG. 11 illustrates a perspective interior view of the internal cabin 202, according to an example of the present disclosure. The strongbacks 200 are disposed within the internal cabin 202. As noted, the strongbacks 200 are configured to receive and retain different types of stowage bins. Different types of stowage bins can be interchangeably secured to and removed from the strongbacks 200. The strongbacks 200 allow for different types of stowage bins to be secured thereto, while the locations of sidewalls 300, AC rails 302, PSU cavity wiring 304, ceiling and cross bin lighting 306, and PSU closeouts 308 remain the stable. That is, even though architecturally different stowage bins can be received and retained by the strongbacks 200, the sidewalls 300, the AC rails 302, PSU cavity wiring 304, ceiling and cross bin lighting 306, and PSU closeouts 308 can remain the same, and need not be changed.

Figure 12:
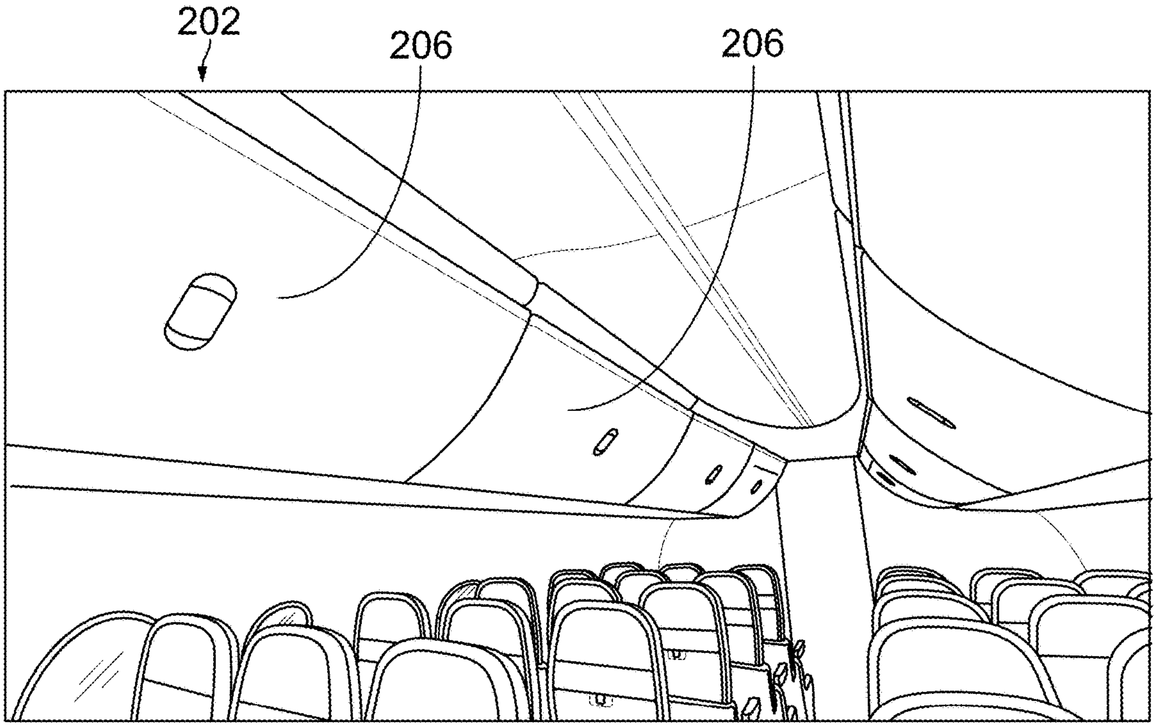
FIG. 12 illustrates a perspective interior view of an internal cabin, according to an example of the present disclosure.

FIG. 12 illustrates a perspective interior view of an internal cabin 202, according to an example of the present disclosure. Referring to FIGS. 11 and 12, the strongbacks 200 can retain the stowage bins 206.

Figure 13:
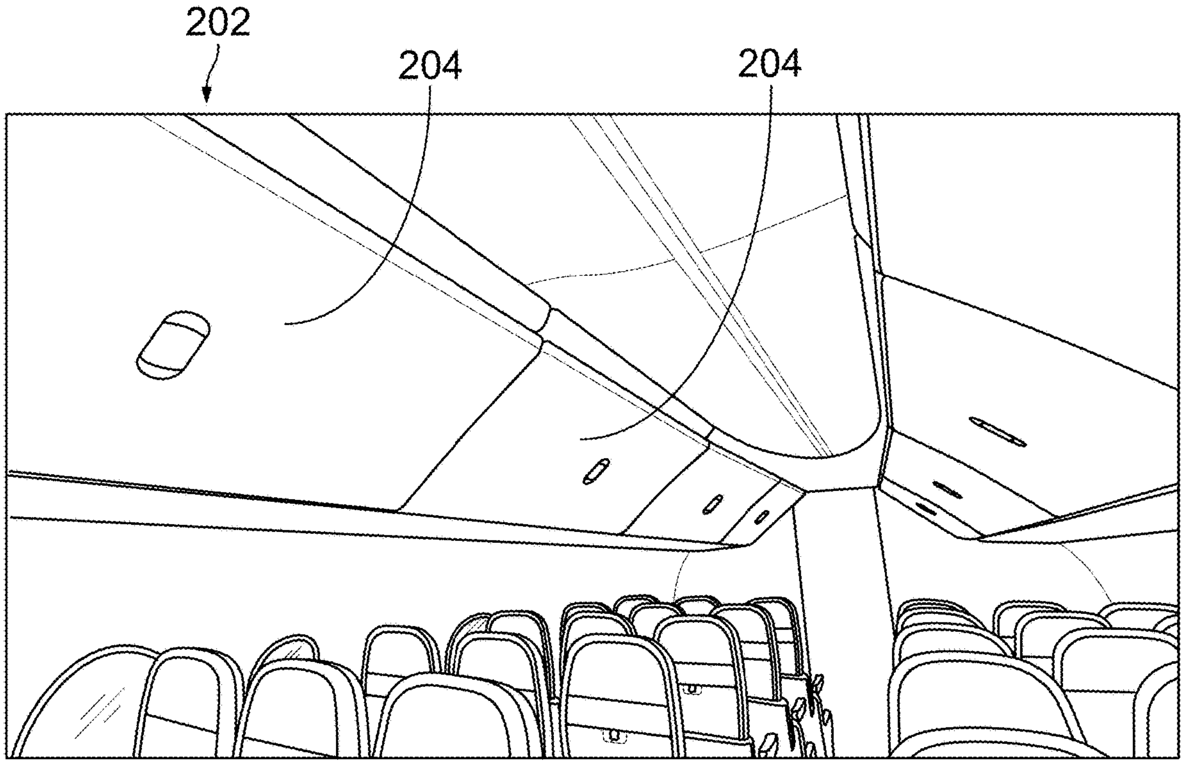
FIG. 13 illustrates a perspective interior view of an internal cabin, according to an example of the present disclosure.

FIG. 13 illustrates a perspective interior view of an internal cabin 202, according to an example of the present disclosure. Referring to FIGS. 11 and 13, the strongbacks 200 can retain the stowage bins 204.

Figure 14:
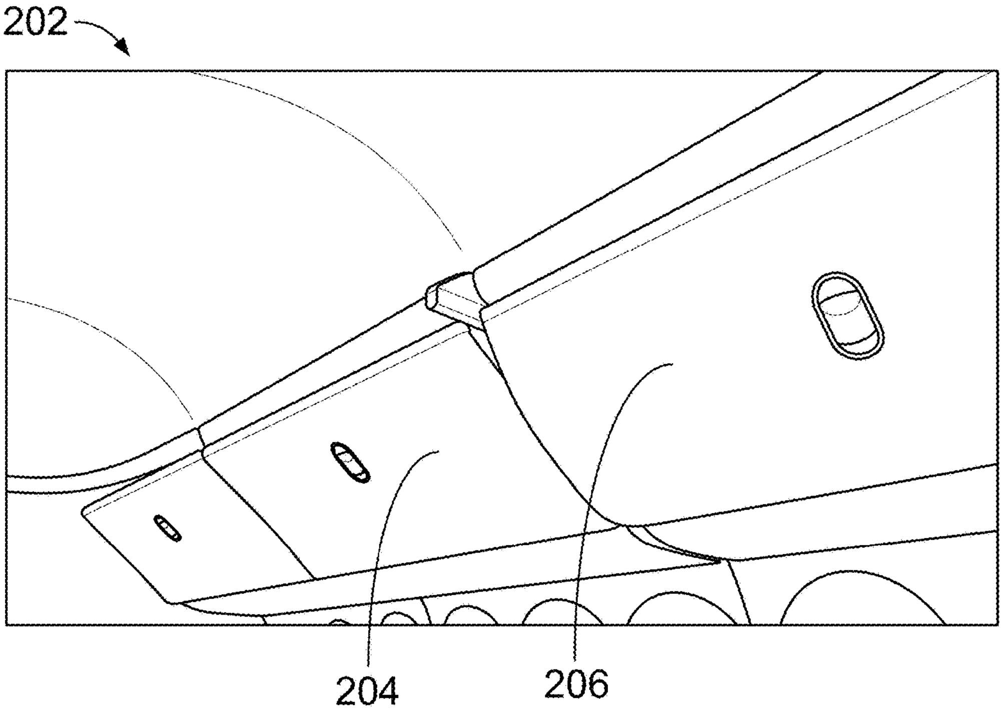
FIG. 14 illustrates a perspective interior view of an internal cabin, according to an example of the present disclosure.

FIG. 14 illustrates a perspective interior view of an internal cabin 202, according to an example of the present disclosure. Referring to FIGS. 11 and 14, some strongbacks 200 can retain the stowage bins 204, while other strongbacks 200 can retain the stowage bins 206.

Figure 15:
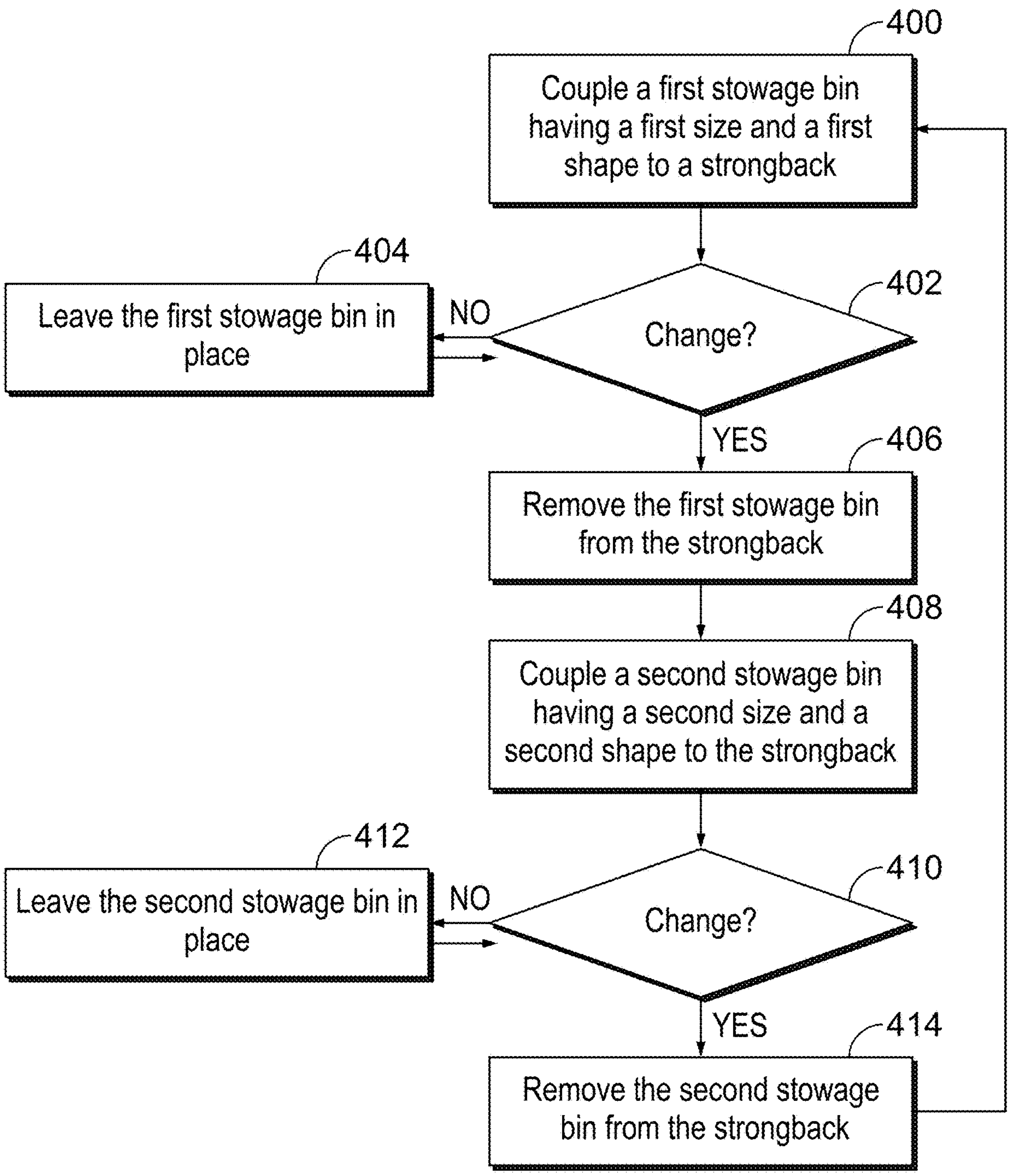
FIG. 15 illustrates a flow chart of a method, according to an example of the present disclosure.

FIG. 15 illustrates a flow chart of a method, according to an example of the present disclosure. Referring to FIGS. 4-15, at 400, a first stowage bin (such as the first stowage bin 204) having a first size and a first shape is coupled to a strongback 200. At 402, an individual determines whether a change of stowage bins is desired. If not, the method proceeds to 404, at which the first stowage bin is left in place. The method can then return to 402.

If, however, a change of stowage bins is desired, the method proceeds from 402 to 406, at which the first stowage bin is removed from the strongback 200. At 408, a second stowage bin (such as the second stowage bin 206) having a second size and a second shape is coupled to the strongback 200. One or both of the first size or the first shape differ from the second size or the second shape, respectively. At 410, an individual determines whether a change of stowage bins is desired. If not, the method proceeds to 412, at which the second stowage bin is left in place. The method can then return to 410.

If, however, a change in stowage bins is desired at 410, the method proceeds to 414, at which the second stowage bin is removed from the strongback 200. The method then returns to 400.

Referring to FIGS. 1-15, examples of the present disclosure provide a universal strongback 200 that is configured to retain different types of stowage bins. For example, the strongback 200 is configured to retain the stowage bin 204, which can be a smaller capacity stowage bin, as well as the stowage bin 206, which can be a larger capacity stowage bin. The strongback 200 can be configured to retain three, four, or more architecturally different stowage bins. The strongback 200 can be used at outboard positions (such as over outboard groups of seats), or at inboard positions (such as over a center group of seats separated from outboard groups of seats by aisles).

Further, the disclosure comprises examples according to the following clauses:

Clause 1. A strongback for an internal cabin of an aircraft, the strongback comprising:

a rear wall;

a lower panel connected to the rear wall;

a closeout bracket connected to the rear wall and the lower panel;

an upper panel connected to the rear wall;

a first end blade connected to the rear wall, the lower panel, the closeout bracket, and the upper panel at a first end; and a second end blade connected to the rear wall, the lower panel, the closeout bracket, and the upper panel at a second end opposite from the first end, wherein a bin-retaining chamber is defined between the rear wall, the lower panel, the closeout bracket, the upper panel, the first end blade, and the second end blade, wherein the strongback is configured to interchangeably receive and retain a first stowage bin and a second stowage bin within the bin-retaining chamber, and wherein the first stowage bin differs from the second stowage bin in one or both of size and shape.

Clause 2. The strongback of Clause 1, wherein the first end blade mirrors the second end blade.

Clause 3. The strongback of Clauses 1 or 2, further comprising:

a first support bracket extending from an outer surface of the first end blade at a first lower outer side to a front lateral edge of the lower panel; and a second support bracket extending from an outer surface of the second end blade at a second lower outer side to a rear lateral edge of the lower panel.

Clause 4. The strongback of Clause 3, wherein each of the first support bracket and the second support bracket comprises a linear strap.

Clause 5. The strongback of any of Clauses 1-4, wherein the first end blade comprises a first pivot coupling on a first interior surface, wherein the second end blade comprises a second pivot coupling on a second interior surface, where the first pivot coupling is coaxial with the second pivot coupling of the second end blade, and wherein the first pivot coupling and the second pivot coupling are configured to pivotally couple to reciprocal pivot members of each of the first stowage bin and the second stowage bin.

Clause 6. The strongback of any of Clauses 1-5, further comprising one or more rate control members extending from rear, interior surfaces of one or both of the first end blade or the second end blade.

Clause 7. The strongback of Clause 6, wherein the one or more rate control members comprise a housing defining an internal chamber, and a piston configured to move within the housing.

Clause 8. The strongback of any of Clauses 1-7, further comprising one or more latch strikes disposed on front interior surfaces of one or both of the first end blade or the second end blade.

Clause 9. The strongback of Clause 8, wherein the first stowage bin comprises one or more first latches having a first length, wherein the second stowage bin comprises one or more second latches having a second length that differs from the first length, and wherein the one or more first latches and the one or more second latches are configured to latchably engage the one or more latch strikes.

Clause 10. A method for an internal cabin of an aircraft, the method comprising:

coupling a first stowage bin having a first size and a first shape to a strongback;

removing the first stowage bin from the strongback; and coupling a second stowage bin having a second size and a second shape to the strongback, wherein one or both of the first size differs from the second size, or the first shape differs from the second shape.

Clause 11. The method of Clause 10, wherein the strongback comprises:

a rear wall;

a lower panel connected to the rear wall;

a closeout bracket connected to the rear wall and the lower panel;

an upper panel connected to the rear wall;

a first end blade connected to the rear wall, the lower panel, the closeout bracket, and the upper panel at a first end; and a second end blade connected to the rear wall, the lower panel, the closeout bracket, and the upper panel at a second end opposite from the first end, wherein a bin-retaining chamber is defined between the rear wall, the lower panel, the closeout bracket, the upper panel, the first end blade, and the second end blade.

Clause 12. An aircraft comprising:

an internal cabin;

a strongback within the internal cabin of an aircraft;

a first stowage bin configured to couple to the strongback, wherein the first stowage bin has a first size and a first shape; and a second stowage bin configured to couple to the strongback, wherein the second stowage bin has a second size and a second shape, wherein one or both of the first size differs from the second size, or the first shape differs from the second shape, and wherein the strongback is configured to interchangeably receive and retain the first stowage bin and a second stowage bin.

Clause 13. The aircraft of Clause 12, wherein the strongback comprises:

a rear wall;

a lower panel connected to the rear wall;

a closeout bracket connected to the rear wall and the lower panel;

an upper panel connected to the rear wall;

a first end blade connected to the rear wall, the lower panel, the closeout bracket, and the upper panel at a first end; and a second end blade connected to the rear wall, the lower panel, the closeout bracket, and the upper panel at a second end opposite from the first end, wherein a bin-retaining chamber is defined between the rear wall, the lower panel, the closeout bracket, the upper panel, the first end blade, and the second end blade.

Clause 14. The aircraft of Clause 13, wherein the first end blade mirrors the second end blade.

Clause 15. The aircraft of Clauses 13 or 14, wherein the strongback further comprises:

a first support bracket extending from an outer surface of the first end blade at a first lower outer side to a front lateral edge of the lower panel; and a second support bracket extending from an outer surface of the second end blade at a second lower outer side to a rear lateral edge of the lower panel.

Clause 16. The aircraft of Clause 15, wherein each of the first support bracket and the second support bracket comprises a linear strap.

Clause 17. The aircraft of any of Clauses 13-16, wherein the first end blade comprises a first pivot coupling on a first interior surface, wherein the second end blade comprises a second pivot coupling on a second interior surface, where the first pivot coupling is coaxial with the second pivot coupling of the second end blade, and wherein the first pivot coupling and the second pivot coupling are configured to pivotally couple to reciprocal pivot members of each of the first stowage bin and the second stowage bin.

Clause 18. The aircraft of any of Clauses 13-17, wherein the strongback further comprises one or more rate control members extending from rear, interior surfaces of one or both of the first end blade or the second end blade.

Clause 19. The aircraft of Clause 18, wherein the one or more rate control members comprise a housing defining an internal chamber, and a piston configured to move within the housing.

Clause 20. The aircraft of any of Clauses 13-19, wherein the strongback further comprises one or more latch strikes disposed on front interior surfaces of one or both of the first end blade or the second end blade, wherein the first stowage bin comprises one or more first latches having a first length, wherein the second stowage bin comprises one or more second latches having a second length that differs from the first length, and wherein the one or more first latches and the one or more second latches are configured to latchably engage the one or more latch strikes.

As described herein, examples of the present disclosure provide a strongback configured to couple to different types and styles of stowage bins. Further, examples of the present disclosure provide methods for efficiently replacing a first style of stowage bin with a different, second style of stowage bin within an internal cabin of a vehicle, such as a commercial aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A strongback for an internal cabin of an aircraft, the strongback comprising:

a rear wall;

a lower panel connected to the rear wall;

a closeout bracket connected to the rear wall and the lower panel;

an upper panel connected to the rear wall;

a first end blade connected to the rear wall, the lower panel, the closeout bracket, and the upper panel at a first end;

a second end blade connected to the rear wall, the lower panel, the closeout bracket, and the upper panel at a second end opposite from the first end, wherein a bin-retaining chamber is defined between the rear wall, the lower panel, the closeout bracket, the upper panel, the first end blade, and the second end blade; and one or more latch strikes disposed on front interior surfaces of one or both of the first end blade or the second end blade, wherein the strongback is configured to interchangeably receive and retain a first stowage bin and a second stowage bin within the bin-retaining chamber, wherein the first stowage bin differs from the second stowage bin in one or both of size and shape, wherein the first stowage bin comprises one or more first latches having a first length, wherein the second stowage bin comprises one or more second latches having a second length that differs from the first length, and wherein the one or more first latches and the one or more second latches are configured to latchably engage the one or more latch strikes.

2. The strongback of claim 1, wherein the first end blade mirrors the second end blade.

3. The strongback of claim 1, further comprising:

a first support bracket extending from an outer surface of the first end blade at a first lower outer side to a front lateral edge of the lower panel; and a second support bracket extending from an outer surface of the second end blade at a second lower outer side to a rear lateral edge of the lower panel.

4. The strongback of claim 3, wherein each of the first support bracket and the second support bracket comprises a linear strap.

5. The strongback of claim 1, wherein the first end blade comprises a first pivot coupling on a first interior surface, wherein the second end blade comprises a second pivot coupling on a second interior surface, where the first pivot coupling is coaxial with the second pivot coupling of the second end blade, and wherein the first pivot coupling and the second pivot coupling are configured to pivotally couple to reciprocal pivot members of each of the first stowage bin and the second stowage bin.

6. The strongback of claim 1, further comprising one or more rate control members extending from rear, interior surfaces of one or both of the first end blade or the second end blade.

7. The strongback of claim 6, wherein the one or more rate control members comprise a housing defining an internal chamber, and a piston configured to move within the housing.

8. A method for an internal cabin of an aircraft, the method comprising:

coupling a first stowage bin having a first size and a first shape to a strongback;

removing the first stowage bin from the strongback; and coupling a second stowage bin having a second size and a second shape to the strongback, wherein one or both of the first size differs from the second size, or the first shape differs from the second shape, wherein the first stowage bin comprises one or more first latches having a first length, wherein the second stowage bin comprises one or more second latches having a second length that differs from the first length, and wherein the one or more first latches and the one or more second latches are configured to latchably engage one or more latch strikes disposed on front interior surfaces of one or both of a first end blade or a second end blade of the strongback.

9. The method of claim 8, wherein the strongback comprises:

a rear wall;

a lower panel connected to the rear wall;

a closeout bracket connected to the rear wall and the lower panel;

an upper panel connected to the rear wall;

the first end blade connected to the rear wall, the lower panel, the closeout bracket, and the upper panel at a first end; and the second end blade connected to the rear wall, the lower panel, the closeout bracket, and the upper panel at a second end opposite from the first end, wherein a bin-retaining chamber is defined between the rear wall, the lower panel, the closeout bracket, the upper panel, the first end blade, and the second end blade.

10. An aircraft comprising:

an internal cabin;

a strongback within the internal cabin of an aircraft;

a first stowage bin configured to couple to the strongback, wherein the first stowage bin has a first size and a first shape, and wherein the first stowage bin comprises one or more first latches having a first length; and a second stowage bin configured to couple to the strongback, wherein the second stowage bin has a second size and a second shape, wherein one or both of the first size differs from the second size, or the first shape differs from the second shape, and wherein the second stowage bin comprises one or more second latches having a second length that differs from the first length, wherein the strongback is configured to interchangeably receive and retain the first stowage bin and a second stowage bin, and wherein the one or more first latches and the one or more second latches are configured to latchably engage one or more latch strikes disposed on front interior surfaces of one or both of a first end blade or a second end blade of the strongback.

11. The aircraft of claim 10, wherein the strongback comprises:

a rear wall;

a lower panel connected to the rear wall;

a closeout bracket connected to the rear wall and the lower panel;

an upper panel connected to the rear wall;

the first end blade connected to the rear wall, the lower panel, the closeout bracket, and the upper panel at a first end; and the second end blade connected to the rear wall, the lower panel, the closeout bracket, and the upper panel at a second end opposite from the first end, wherein a bin-retaining chamber is defined between the rear wall, the lower panel, the closeout bracket, the upper panel, the first end blade, and the second end blade.

12. The aircraft of claim 11, wherein the first end blade mirrors the second end blade.

13. The aircraft of claim 11, wherein the strongback further comprises:

a first support bracket extending from an outer surface of the first end blade at a first lower outer side to a front lateral edge of the lower panel; and a second support bracket extending from an outer surface of the second end blade at a second lower outer side to a rear lateral edge of the lower panel.

14. The aircraft of claim 13, wherein each of the first support bracket and the second support bracket comprises a linear strap.

15. The aircraft of claim 11, wherein the first end blade comprises a first pivot coupling on a first interior surface, wherein the second end blade comprises a second pivot coupling on a second interior surface, where the first pivot coupling is coaxial with the second pivot coupling of the second end blade, and wherein the first pivot coupling and the second pivot coupling are configured to pivotally couple to reciprocal pivot members of each of the first stowage bin and the second stowage bin.

16. The aircraft of claim 11, wherein the strongback further comprises one or more rate control members extending from rear, interior surfaces of one or both of the first end blade or the second end blade.

17. The aircraft of claim 16, wherein the one or more rate control members comprise a housing defining an internal chamber, and a piston configured to move within the housing.

18. The strongback of claim 1, wherein the first end blade and the second end blade provide face panels having common start and end points in relation to movement of both of the first stowage bin and the second stowage bin, wherein the first end blade and the second end blade conform to an end contour of the first stowage bin, wherein first end walls of the first stowage bin are sized and shaped the same as the first end blade and the second end blade, wherein the first end walls do not forwardly extend past front edges of the first end blade and the second end blade when the first stowage bin is in a first closed position, and wherein second end walls of the second stowage bin forwardly-extend past the front edges of the first end blade and the second end blade when the second stowage bin is in a second closed position.

19. The method of claim 8, wherein the first end blade and the second end blade provide face panels having common start and end points in relation to movement of both of the first stowage bin and the second stowage bin, wherein the first end blade and the second end blade conform to an end contour of the first stowage bin, wherein first end walls of the first stowage bin are sized and shaped the same as the first end blade and the second end blade, wherein the first end walls do not forwardly extend past front edges of the first end blade and the second end blade when the first stowage bin is in a first closed position, and wherein second end walls of the second stowage bin forwardly-extend past the front edges of the first end blade and the second end blade when the second stowage bin is in a second closed position.

20. The aircraft of claim 10, wherein the first end blade and the second end blade provide face panels having common start and end points in relation to movement of both of the first stowage bin and the second stowage bin, wherein the first end blade and the second end blade conform to an end contour of the first stowage bin, wherein first end walls of the first stowage bin are sized and shaped the same as the first end blade and the second end blade, wherein the first end walls do not forwardly extend past front edges of the first end blade and the second end blade when the first stowage bin is in a first closed position, and wherein second end walls of the second stowage bin forwardly-extend past the front edges of the first end blade and the second end blade when the second stowage bin is in a second closed position.

* * * * *